US008644238B2

(12) United States Patent  
Tiirola et al.

(10) Patent No.: US 8,644,238 B2
(45) Date of Patent: Feb. 4, 2014

(54) DEMODULATION REFERENCE SIGNALS IN A COMMUNICATION SYSTEM

(75) Inventors: Esa Tapani Tiirola, Kempele (FI); Kari Juhani Hooli, Oulu (FI); Kari Pekka Pajukoski, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 41 days.

(21) Appl. No.: 13/266,597

(22) PCT Filed: Apr. 27, 2009

(86) PCT No.: PCT/EP2009/055072
§ 371 (c)(1),
(2), (4) Date: Dec. 19, 2011

(87) PCT Pub. No.: WO2010/124716
PCT Pub. Date: Nov. 4, 2010

(65) Prior Publication Data
US 2012/0106473 A1     May 3, 2012

(51) Int. Cl.
*H04W 4/00* (2009.01)
(52) U.S. Cl.
USPC .......................................................... 370/329
(58) Field of Classification Search
USPC .............. 370/328, 329, 330, 319, 310, 310.2, 370/335, 341, 343, 431, 436
See application file for complete search history.

(56) References Cited

U.S. PATENT DOCUMENTS

| 6,219,333 | B1 * | 4/2001 | Ahn | 370/203 |
| 6,310,863 | B1 * | 10/2001 | Yamamoto | 370/281 |
| 6,603,755 | B1 * | 8/2003 | Parker | 370/342 |
| 2001/0008542 | A1 * | 7/2001 | Wiebke et al. | 375/141 |
| 2009/0190488 | A1 * | 7/2009 | Hochwald et al. | 370/252 |

FOREIGN PATENT DOCUMENTS

CN     101384078 A     3/2009
EP     2129019 A1 * 12/2009

OTHER PUBLICATIONS

R1-070268, "Sequence Hopping for the Uplink Reference Signal", Texas Instruments, 3GPP TSG RAN WG1 #47bis, Sorrento, Italy, Jan. 15-19, 2007, 8 pgs.
R1-091267, "Considerations on the Uplink Reference Signal for CoMP", Hauwei, 3GPP TSG RAN WG1 meeting #56bis, Seoul, Korea, Mar. 23-27, 2009, 4 pgs.
Thomson Scientific, "Database WPI week 200925", Feb. 11, 2010, 1 pg.

* cited by examiner

*Primary Examiner* — Kwang B Yao
*Assistant Examiner* — Anh Ngoc Nguyen
(74) *Attorney, Agent, or Firm* — Harrington & Smith

(57) ABSTRACT

At least two modes of communicating demodulation reference signals in a system providing a multiple of communication points for communication devices are provided. In a first mode demodulation reference signals are communicated based on an sequence group and separation of sequences provided by adjustment of transmitted demodulation reference signals. In a second mode demodulation reference signals are communicated based on one or more sequence groups and non-adjusted transmission of demodulation reference signals.

53 Claims, 7 Drawing Sheets

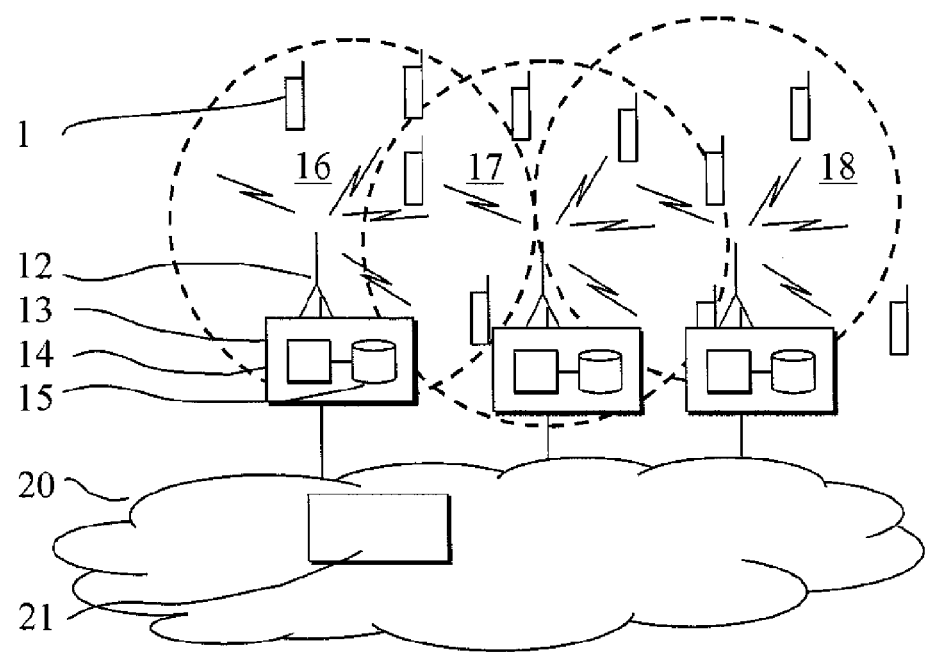
Fig. 1
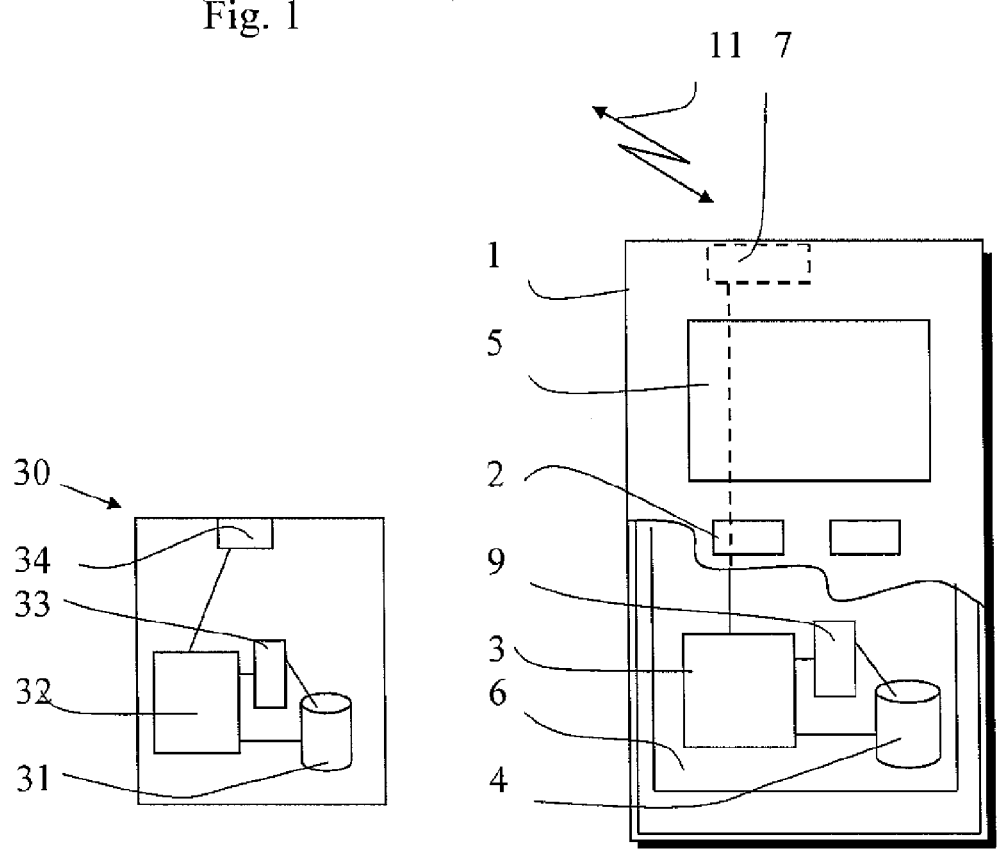
Fig. 3
Fig. 2

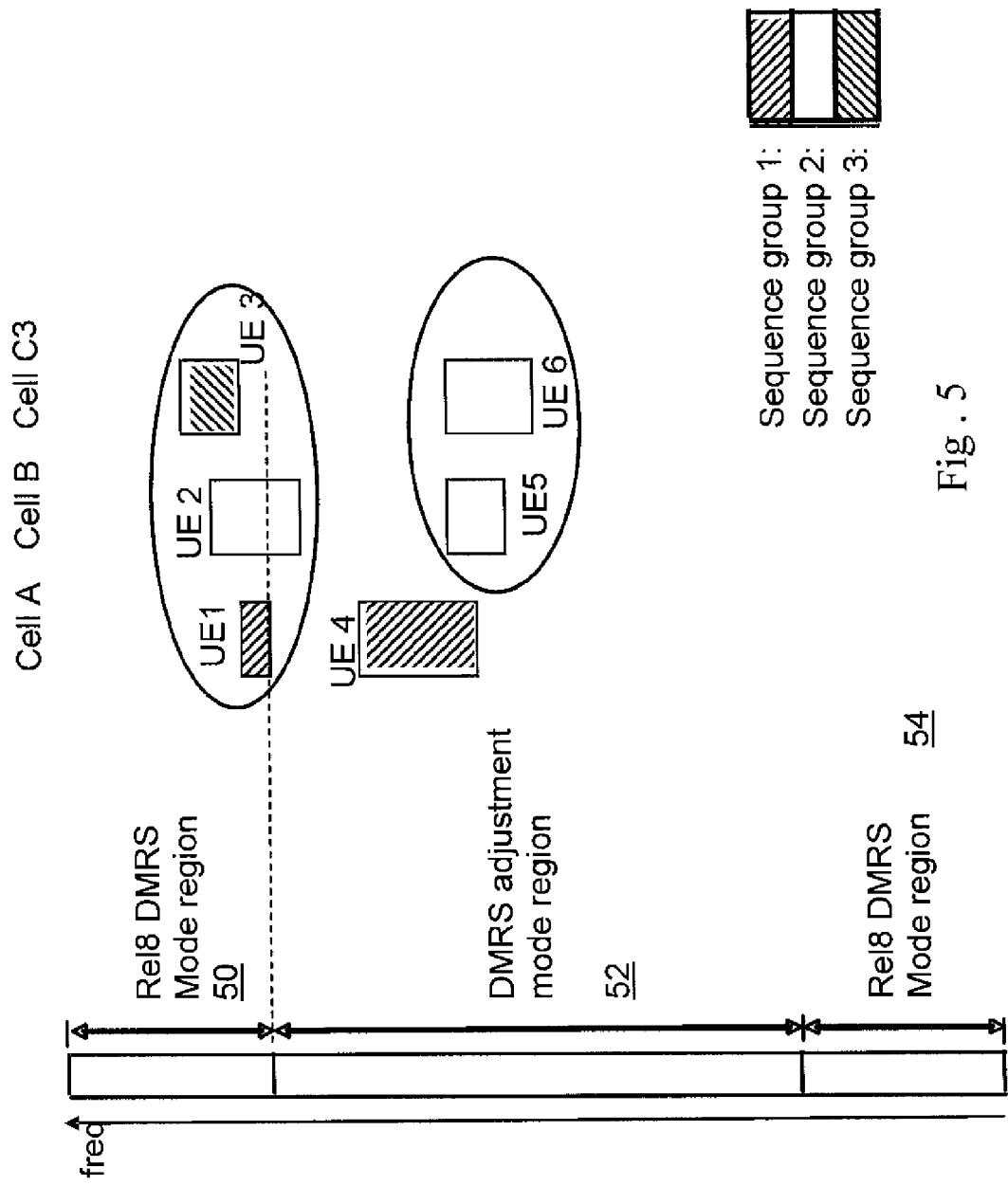

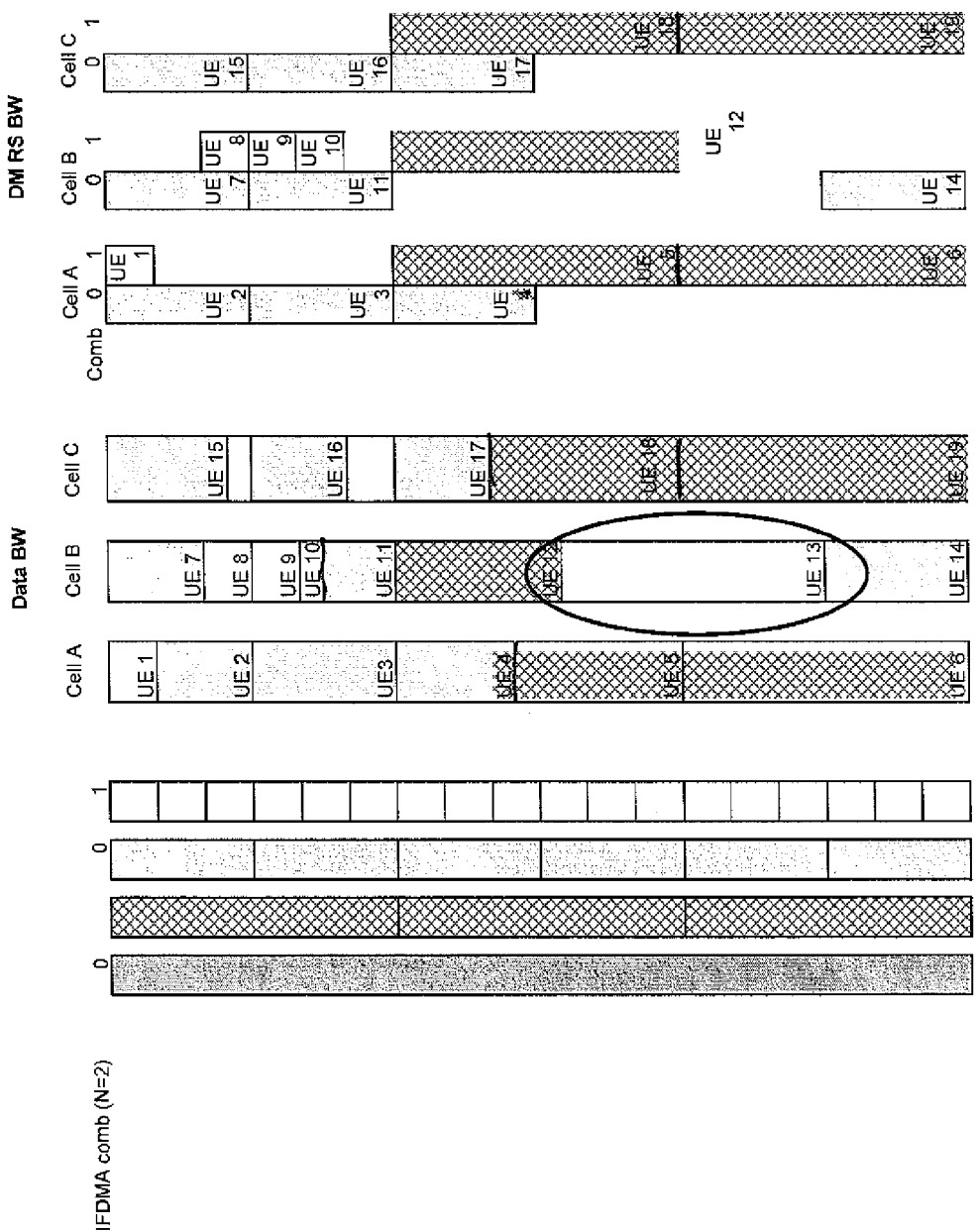

DEMODULATION REFERENCE SIGNALS IN A COMMUNICATION SYSTEM

The invention relates to demodulation references signals, and more particularly but not exclusively to communication of demodulation reference signals in a communication system where communications may occur between multiple points of communication.

A communication system can be seen as a facility that enables communication sessions between two or more entities such as mobile communication devices, base stations and/or other communication points. A communication system and compatible communicating entities typically operate in accordance with a given standard or specification which sets out what the various entities associated with the system are permitted to do and how that should be achieved. For example, the standards, specification and protocols can define the manner how and based on which access technology communication devices can access the communication system and how communication shall be implemented between communicating devices, the elements of a communication network and/or other communication devices. In a wireless communication system at least a part of the communication between at least two stations occurs over a wireless link. Examples of wireless systems include public land mobile networks (PLMN) such as cellular networks, satellite based communication systems and different wireless local networks, for example wireless local area networks (WLAN). The wireless systems can be divided into cells, and are therefore often referred to as cellular systems.

A user can access the communication system by means of an appropriate communication device. A communication device of a user is often referred to as user equipment (UE) or user terminal. A communication device is provided with an appropriate signal receiving and transmitting arrangement for enabling communications with other parties. Typically a communication device is used for enabling the users thereof to receive and transmit communications such as speech and data. In wireless systems a communication device provides a transceiver station that can communicate with e.g. a base station of an access network providing at least one cell and/or another communications device. Depending on the context, a communication device may also be considered as being a part of a communication system. In certain applications, for example in adhoc networks, the communication system can be based on use of a plurality of user equipment capable of communicating with each other.

An example of communications systems is an architecture that is being standardized by the $3^{rd}$ Generation Partnership Project (3GPP) known as the long-term evolution (LTE) of the Universal Mobile Telecommunications System (UMTS) radio-access technology. The LTE technology aims to achieve various improvements, for example reduced latency, higher user data rates, improved system capacity and coverage, reduced cost for the operator and so on. A further development of the LTE is often referred to as LTE-Advanced. The LTE-Advanced aims to provide further enhanced services by means of even higher data rate and lower latency with reduced cost. The various development stages of the 3GPP LTE specifications are referred to as releases. Backward compatibility of later versions for a standard with earlier versions of the standard is typically desired. For this reason, backward-compatibility of later versions with the existing LTE compatible devices and stations would be desired. Thus a release 8 compatible communication device should be able to work in a radio network that is configured in accordance with later releases and vice versa.

Various sources of error may limit the performance of a communication system. Transmission of signals by communicating entities is known to interfere with other communications links. Another cause for errors is thermal noise. The disadvantageous effects of performance limiting errors can be mitigated by efficient transmission methods. To provide this reference signals and coherent detection thereof can be utilized. In coherent detection, the carrier phase of the received signal is detected at the receiver. It is common to add a reference signal to a payload signal so that the signal may be received coherently at a receiver. For example, constant amplitude zero autocorrelation waveform (CAZAC) sequences can be used as reference signals. Other sequences may also be used, such as computer searched Zero-Autocorrelation (ZAC) sequences.

LTE Release 8 introduced separation of reference signals based on sequence groups. A sequence group contains demodulation reference signal sequences of all allowed bandwidths. In this particular standard one to two sequences are proposed for each bandwidth option. In a cell, Physical Uplink Shared Channel (PUSCH) demodulation reference signal sequences are from single sequence group at any given time. To provide this in LTE Release 8, demodulation reference signal sequences that have highest cross-correlation between sequences of different lengths are grouped into the same sequence group.

The following example of use of reference signals is described with reference to an uplink (UL) reference signal arrangement in coordinated multi-point (CoMP) reception. Uplink coordinated multi-point (CoMP) implies reception of a transmitted signal at multiple, geographically separated points. For example, the reception may be via a multiple antennas, base stations or cells. A problem may arise in how to arrange demodulation reference signal (DM RS) resources between different stations of the system, for example different cells and different communication devices within a coordinated multi-point area so that an acceptably low cross-correlation between different demodulation reference signals can be achieved. It would be desirable to have nearly orthogonal demodulation reference signal sequences available when needed for coordinated multi-point.

One proposal how to arrange nearly orthogonal demodulation reference signal sequence is to use cyclic shifts. Cyclically shifted versions of a CAZAC sequence typically are highly orthogonal with each other. Thus, cyclically shifted versions of such a sequence may be advantageously used as a reference signal. However, in order for the cyclic shifts to be orthogonal, the same constant amplitude zero autocorrelation waveform (CAZAC) sequence would need to be used in different communication devices. This can mean in certain situations that resources allocated to different communication devices, if demodulation reference signals are separated with cyclic shifts, may need to have equal bandwidth and exactly the same location in frequency. Further, to allow cyclic shift separation between cells, the same sequence group should be used in all involved cells. Due to way the sequences are grouped for example in the LTE Release 8, this may result the highest possible demodulation reference signal cross-correlations, if allocations of different bandwidths are used in the coordinated multi-point cells.

Therefore use of cyclic shift separation on demodulation reference signal may imply scheduling restrictions, for example in view of bandwidth allocation, over the cells in coordinated multi-point area. This may be so regardless if scheduled user equipments benefit from nearly orthogonal demodulation reference signal sequences in coordinated multi-point area or not.

It is noted that the above discusses only examples, and the issues are not limited to any particular communication environment, standard, specification and so forth, but may occur in any appropriate communication system where communications to multiple points may take place.

Embodiments of the invention aim to address one or several of the above issues.

In accordance with an embodiment there is provided a method, comprising providing at least two modes of communicating demodulation reference signals in a system providing a multiple of communication points for communication devices, wherein in a first mode demodulation reference signals are communicated based on an sequence group and separation of sequences provided by adjustment of transmitted demodulation reference signals; and in a second mode demodulation reference signals are communicated based on one or more sequence groups and non-adjusted transmission of demodulation reference signals.

In accordance with another embodiment there is provided a control apparatus configured to control use of at least two modes of demodulation reference signals communications in a system providing a multiple of communication points for communication devices, wherein in a first mode demodulation reference signals are communicated based on an adjusted sequence group and separation of sequences provided by adjustment of transmitted demodulation reference signals and in a second mode demodulation reference signals are communicated based on one or more sequence groups and non-adjusted transmission of demodulation reference.

The control apparatus may be provided in association with a base station or another network element, or in a communication device.

In accordance with a more detailed embodiment, the separation of reference signals in the first mode comprises orthogonalisation of the reference signals. The separation in the first mode may also or alternatively comprise cyclic shifting of the demodulation reference signals. The separation in the first mode may also comprise adjusting bandwidth and/or applying an interleaved frequency division multiple access (IFDMA) comb to the demodulation reference signals. The first mode may also comprise adjusting cyclic shifting of the demodulation reference signal. Block spreading may be used to separate demodulation reference signals.

Use of the different modes may be controlled based on a bandwidth tree. The bandwidth tree may resemble a sounding reference signal bandwidth tree. The bandwidth tree may be arranged to have wider bandwidths that are multiples of a narrower bandwidth or the bandwidth tree is arranged to provide different bandwidth options. An indication may be provided for a communication device of a bandwidth tree to be used.

In accordance with an embodiment the first mode is selected when substantially orthogonal demodulation reference signal sequences are considered necessary and the second mode is selected where demodulation when demodulation reference signal orthogonality is not considered necessary. The separation in the first mode may comprise adjusting demodulation reference signals to provide substantially orthogonal demodulation references signals in a plurality of cells.

A communication device may select one of the available modes based on dedicated signalling and/or broadcasting. The mode may be selected based on radio resource control signalling and/or uplink grant signalling and/or a scheduling rank and a threshold and/or information regarding frequency location of a physical resource block allocation.

Switching from a mode to another mode may take place in response to detection of a predefined event. For example, the second mode may be selected as a default mode and switching to the first mode may take place in response to determination of a need for improved orthogonality.

A computer program comprising program code means adapted to perform one or more of the herein disclosed methods can also be provided.

Various other aspects and further embodiments are also described in the following detailed description of examples embodying the invention and in the attached claims.

The invention will now be described in further detail, by way of example only, with reference to the following examples and accompanying drawings, in which:

FIG. 1 shows an example of a communication system wherein below described examples of the invention may be implemented;

FIG. 2 shows an example of a communication device;

FIG. 3 shows an example of a controller for a base station;

FIG. 5 shows an embodiment;

FIGS. 7 and 8 show examples for demodulation reference signals adjustments;

Figure 4B:
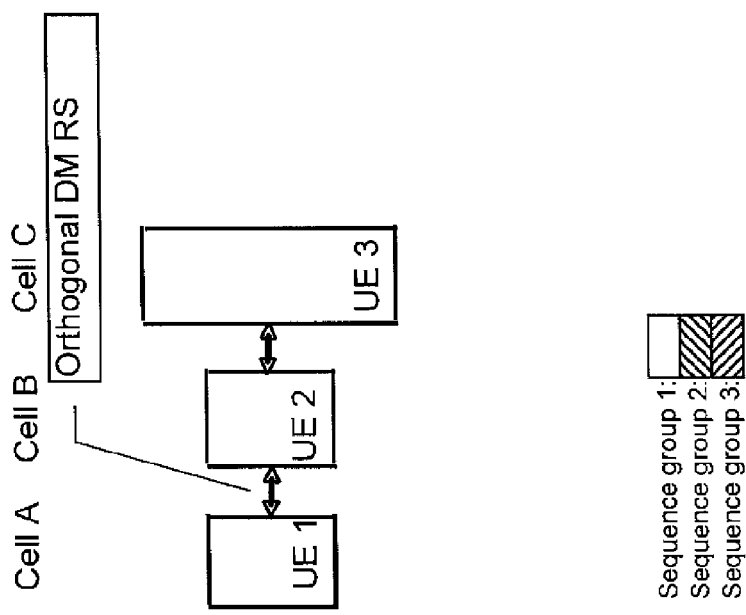
FIGS. 4a and 4b show possible access system set-ups.

In the following certain exemplifying embodiments are explained with reference to a wireless or mobile communication system serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

A communication device 1 can be used for accessing various services and/or applications provided via a communication system. The communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast content. Non-limiting examples of the content include downloads, television and radio programs, videos, advertisements, various alerts and other information.

A mobile communication device 1 is typically provided wireless access via at least one base station 12 or similar wireless transmitter and/or receiver node of an access system. In FIG. 1 three access systems 16, 17 and 18 are shown. However, it is noted that instead of three access systems, any number of access systems may be provided in a communication system. An access system may be provided by a cell of a cellular system or another system enabling a communication device to access a communication system. A base station site 12 can provide one or more cells of the plurality of cells of a cellular communication system. A base station can be configured to provide a cell, but a base station can also provide, for example, three sectors, each sector providing a cell. Each mobile communication device 1 and base station 12 may have one or more radio channels open at the same time and may send and/or receive signals from more than one source.

A base station 12 is typically controlled by at least one appropriate controller so as to enable operation thereof and management of mobile communication devices 1 in communication with the base station. The control apparatus can be interconnected with other control entities. In FIG. 1 the controller is shown to be provided by block 13. A base station control apparatus is typically provided with memory capacity 15 and at least one data processor 14. It shall be understood that the control apparatus and functions may be distributed between a plurality of control units.

The cell borders or edges are schematically shown by the dashed lines in FIG. 1. It shall be understood that the sizes and shapes of the cells may vary considerably from the similarly sized circles of FIG. 1. The cell areas typically overlap. Thus signals transmitted in a cell can interfere with communications in another cell.

The communication devices 1 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the more recent developments in communication systems is the long-term evolution (LTE) of the Universal Mobile Telecommunications System (UMTS) that is being standardized by the $3^{rd}$ Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 example the base stations of the access systems are connected to a wider communications network 20. A controller 21 may be provided in the network 20 for coordinating the operation of the access systems. Although not shown, a gateway function may also be provided to connect to another network via the network 20. The other network may be any appropriate network, for example another communication network, a packet data network and so on. A communication system may thus be provided by one or more interconnect networks and the elements thereof, and one or more gateways may be provided for interconnecting various networks.

FIG. 2 shows a schematic, partially sectioned view of a communication device 1 that a user can use for communication with a communication system. Such a communication device is often referred to as user equipment (UE). An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device 1 may receive signals over an air interface 11 via appropriate apparatus for receiving and may transmit signals via appropriate apparatus for transmitting radio signals. In FIG. 2 a transceiver is designated schematically by block 7. The transceiver may be provided for example by means of a radio part and associated antenna arrangement. The antenna arrangement may be arranged internally or externally to the mobile device.

A mobile device is also typically provided with at least one data processing entity 3, at least one memory 4 and other possible components 9 for use in software aided execution of tasks it is designed to perform, including control of access to and communications with access systems and other communication devices. The data processing, storage and other relevant control apparatus can be provided on an appropriate circuit board and/or in chipsets. This feature is denoted by reference 6. The control apparatus can be configured to execute tasks that relate to demodulation, for example demodulation reference signal detection and use of the reference signal in demodulation of data received from a transmitting station.

In accordance with an example a determination can be made by the communication device which mode to use when in an access system where at least two modes of communicating demodulation reference are provided. For example, a selection can be made if a first mode where demodulation reference signals are communicated based on a sequence group and separation of sequences within the group or a second mode where demodulation reference signals are communicated and separated based on a plurality of sequence groups is to be used. The selection may be made based on signalling received from a base station.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile communication device may comprise appropriate connectors (either wired or wireless) to other devices and/or for connecting external accessories, for example hands-free equipment, thereto.

FIG. 3 shows an example of a control apparatus 30 for a communication system, for example to be coupled to a station of an access system. The control apparatus 30 can be arranged to provide control on communications by mobile communication devices that are in the area of the system. The control apparatus 30 can be configured to facilitate the at least the two modes of demodulation reference signals communications. For this purpose the control apparatus comprises at least one memory 31, at least one data processing unit 32, 33 and an input/output interface 34. Via the interface the control apparatus can be coupled to a receiver and a transmitter of an access system, for example a base station antenna, so that it can receive/transmit a transmission from/to the communication device. The control apparatus 30 can be configured to execute an appropriate software code to provide the control functions as explained below in more detail where more detailed examples for different control functions are given.

The following gives an example how to support different modes of communicating demodulation reference signals in a situation where a plurality of communication devices can communicate in an area covered by a plurality of stations or other elements providing a transmission and/or reception facility, i.e. where multiple points of communication and multiple simultaneous communication links can be provided.

In such a situation it may be advantageous to have a demodulation reference signal arrangement that allows for nearly orthogonal demodulation reference signal sequences when this is considered as necessary and demodulation reference signal sequences with acceptable cross-correlation when demodulation reference signal orthogonality is not considered necessary. The below explained embodiments may provide this without imposing tight scheduling restrictions, in particular where scheduling restrictions are caused by bad demodulation reference signal cross-correlation properties between sequences of different length within a sequence group.

Figure 4A:
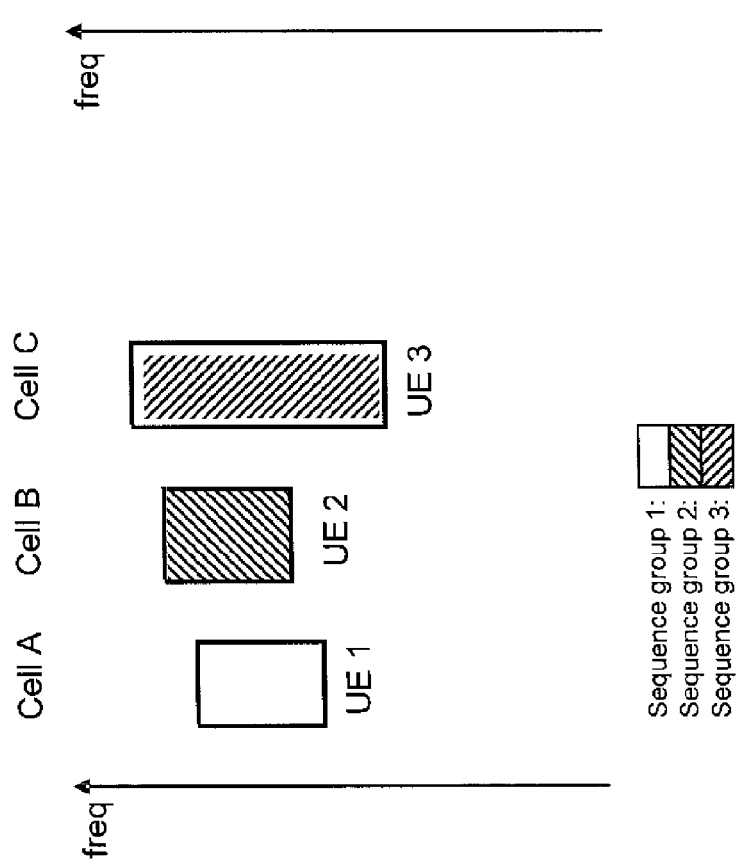

Such a situation is illustrated in FIGS. 4a and 4b wherein LTE Release 8 based demodulation reference signal setup is shown in FIG. 4a and the situation what might happen if a single sequence group would be used for three cells is shown in FIG. 4b. More particularly, if different scheduling groups are used as shown in FIG. 4a, there is no orthogonality over the cells A to C and no particular scheduling restrictions may need to be imposed.

In FIG. 4b all communication devices are shown to use sequence group 1. This might in certain situations result orthogonal demodulation reference signals and high cross-correlation between the communication devices in the different cells. This is indicated by the double ended arrows between the communication devices UE1 and UE2, and UE2 and UE3, respectively. It is noted that use of a sequence group may cause scheduling restrictions regardless whether the communications between multiple points is needed or not.

Figure 9:
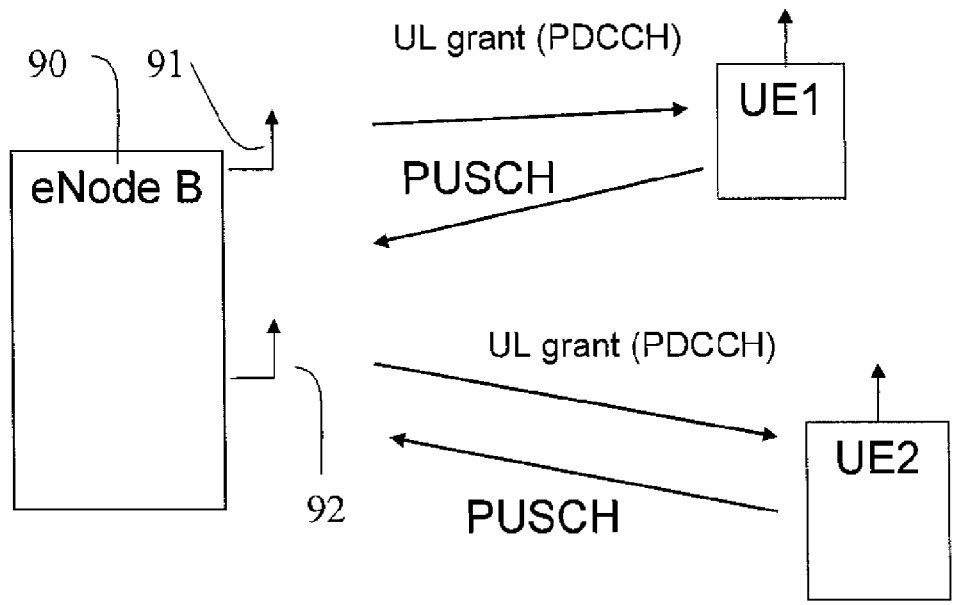
FIG. 9 shows an example or another communication system where some of the embodiments may be utilised.

Similar situation may occur in other system where communications between multiple points of communication is provided. An example of such a system is shown in FIG. 9 where multi-user multiple input multiple output (MU-MIMO) is employed. Multi-user MIMO enhances the communication capabilities of individual stations by using multiple independent stations, antennas or other transmitting and/or receiving elements. In FIG. 9 MU-MIMO arrangement is provided by means of the plurality of antennas 91, 92 of eNode B (eNB) 90. A user equipment can communicate with more than one of the antennas, as illustrated by the arrows between UE1 and the eNode B 90. The eNB may provide at least partially overlapping uplink resource allocation in frequence/time for a multiple of user equipments. The eNB has capability to provide an index for orthgonal reference signal resources for the user equipments being paired for the MU-MIMO. This can be made using DM RS Cyclic shift field included in uplink grants. An example of the techniques that can be used to facilitate MU-MIMO is space-division multiple access (SDMA) which allows a communication device to transmit and/or receive signal to and/or from multiple users in the same band simultaneously. Multi-user MIMO can thus leverage multiple users as spatially distributed transmission resources. The scheduling restriction may be less severe in MU-MIMO based systems, though, since the impact is typically limited to scheduling within a single cell.

Regardless of the system, it can be noted that if cross-correlation properties between demodulation reference signal sequences are not good enough this may result degrading coordinated multi-point performance, as the properties of the demodulation reference signal sequences may be the limiting the performance. This is the case for example when receivers targeting to mitigate inter-cell interference are in use with coordinated multi-point reception.

A way to provide nearly orthogonal demodulation reference signal sequence is to use cyclic shifts of the reference signals, for example by applying a cyclic shift increment value between the reference signals of multiple transmission streams. The cyclic shifts of reference signals may be controlled by an appropriate network element. The network element may be configured to determine configurable cyclic shift increment value according to given criteria. The selected values may then be transmitted to relevant communication devices. It is possible to determine the cyclic shift increment value to be common in a given cell, or multiple cells. Alternatively, it is possible to define the cyclic shift increment in a communication device specific manner or even transmission antenna specific manner. In accordance with a possibility, if multi-user multiple input multiple output (MU-MIMO) scheduling and/or coordinated multi-point (CoMP) is applied in the uplink transmission direction, a configurable cyclic shift increment value may be configured at the communication system to provide cyclic shift separation between the reference signals of different users. An appropriate network element may be configured to store the required values needed in determination of the value in a memory. For example, if the control apparatus 30 determines the cyclic shift increment value, the processor 32 and memory 31 can be utilised in the determination and storage.

Use of cyclic shifting, however, may in certain situations induce scheduling restrictions over the cells, for example due to the bad demodulation reference signal cross-correlation properties between sequences of different lengths within the same sequence group. In accordance with an embodiment a demodulation reference signal arrangement is provided to allow for substantially orthogonal or otherwise acceptably low cross-correlations between different communication devices within a coordinated multi-point area, for example in the area of a plurality of cells as shown in FIG. 1. The same principles can be applied to multi-user multiple input multiple output (MU-MIMO) scheduling within a single cell or other access network, for example a wireless area network. In the latter mentioned case nearly orthogonal or otherwise acceptably low cross-correlations between demodulation reference signals of user equipments having different bandwidth allocation with MU-MIMO scheduling can be provided.

Figure 10:
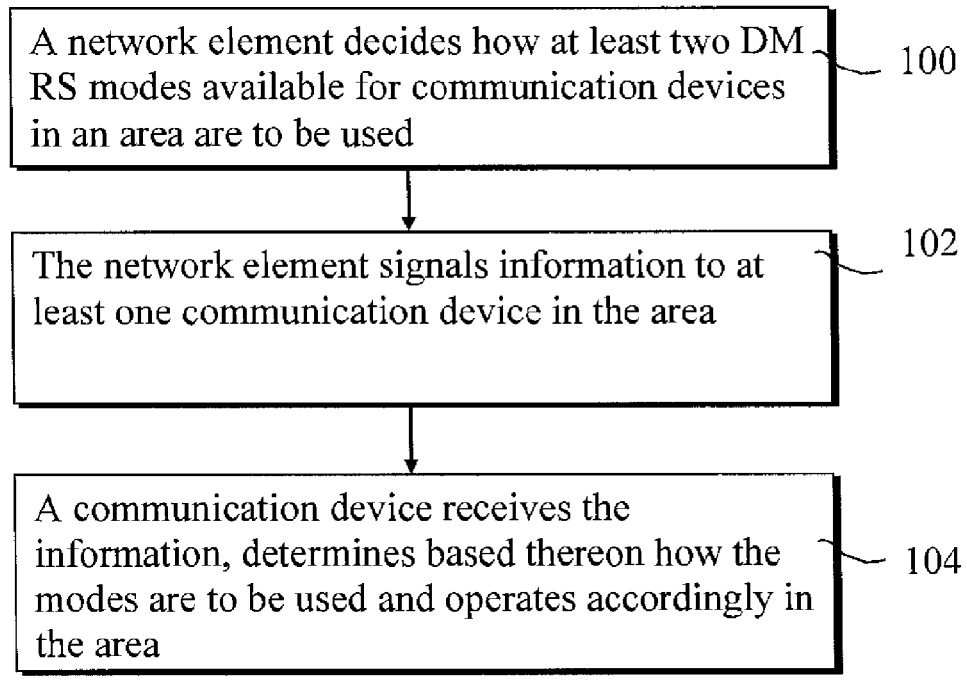
FIG. 10 is a flowchart illustrating an embodiment.

To provide acceptably low cross-correlations two uplink demodulation reference signal (DM RS) modes are made available for the communication devices in a relevant area where radio communications between multiple of points of communication is facilitated. An example of an arrangement where two different demodulation reference signal modes, and more particularly an unmodified mode' and a 'modified mode' or 'adjustment mode' are provided in an area is shown in FIG. 5. A possible flow of operation is shown in the flowchart of FIG. 10. In one of the modes adjustments may be provided on the demodulation reference signal transmission, and thus one of the modes is termed adjustment mode. The embodiment aims to address the issue of scheduling restrictions, for example by means of at least one of a combination of use of IFDMA and a cover code, demodulation reference signal bandwidth extension, demodulation reference signal alignment with the use of a demodulation reference signal tree.

Figure 6B:
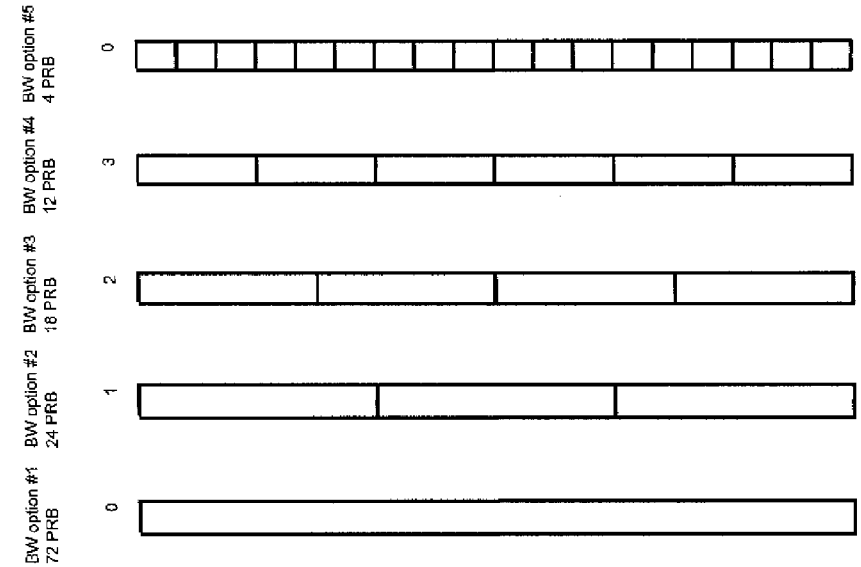
FIGS. 6a and 6b show possible bandwidth trees.
Figure 6A:
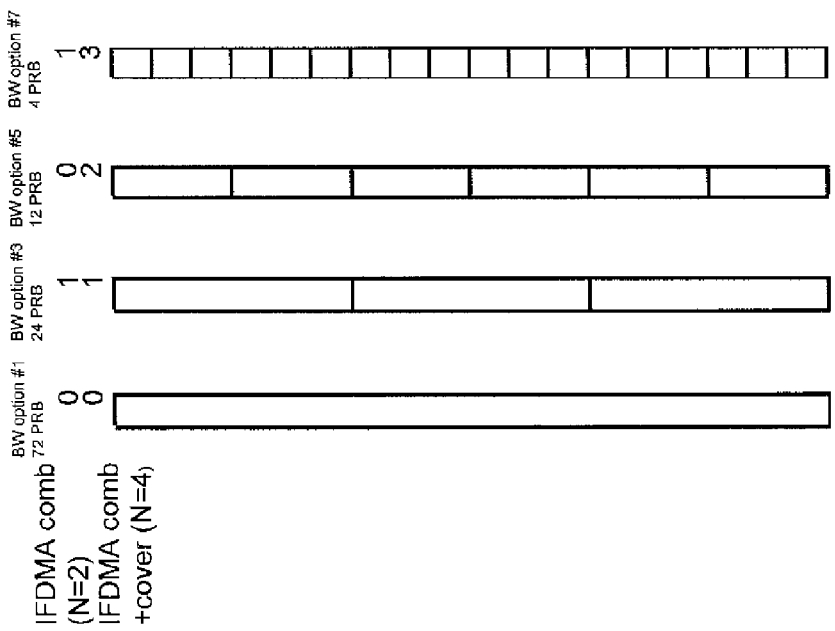
Figure 8:
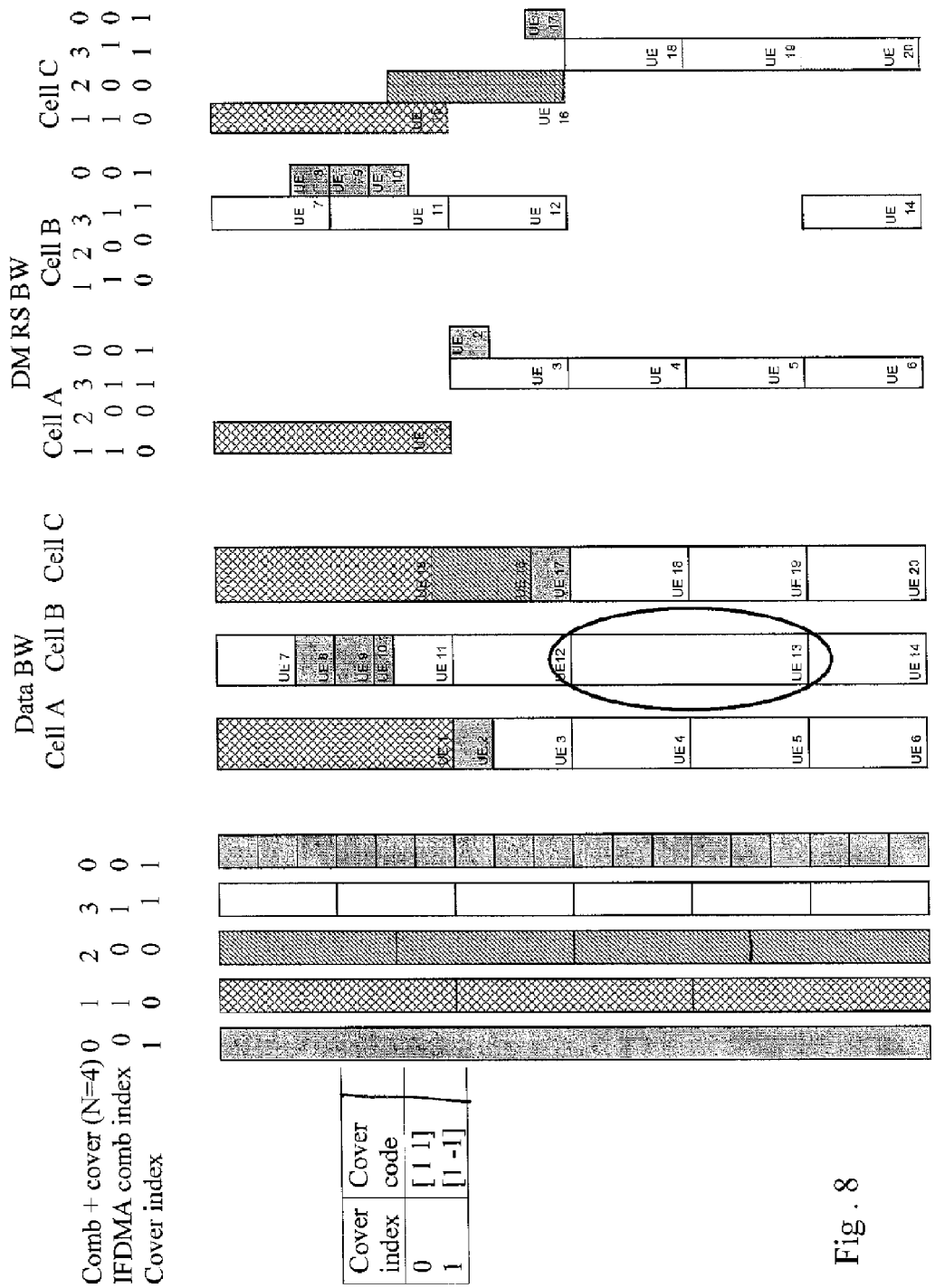

Examples for possible bandwidth trees are shown in FIGS. 6a and 6b. A demodulation reference signal tree can be used to provide a predefined demodulation reference signal bandwidth and frequency position coordination over the cells. Examples for use of IFDMA are shown in FIGS. 7 and 8.

In the example of FIG. 5 the modes are termed 'Rel8 DMRS' mode and 'DMRS adjustment' mode. The modes are provided for communication devices UE1 to UE6 within the area of cells A, B and C of the system. The different modes are used in different frequency regions such that regions 50 and 54 provide Rel8 DMRS mode and region 52 provides a DMRS adjustment mode. The DMRS adjustment mode provides for orthogonal demodulation reference signal across cells A to C with different bandwidth (BW) allocations. In the DMRS adjustment mode, same sequence group can be used among the DMRS adjustment capable user equipments within the coordinated multi-point area provided by cells A to C. The reference signals are then separated within the group. For example, cyclic shifting of the reference signals and/or Interleaved Frequency Division Multiple Access (IFDMA) based combs can be used to provide nearly orthogonal demodulation reference signals within the coordinated multi-point area. Adjustment of demodulation reference signal bandwidth and/or cyclic shift by e.g. alignment over the cells may be required in some situations.

User equipments in 'Rel8 DMRS' mode can use different sequence groups in the different cells A to C within the coordinated multi-point area. Demodulation reference signal cross-correlations can be, for example, similar to the current situation in accordance with the LTE Release 8. Demodulation reference signal coordination over the cells is not necessarily required in this mode.

Introduction of demodulation reference signal modes may require some additional signalling. The additional signalling can be signalled either fully in user equipment specific radio resource control (RRC) messages, partly on a broadcast channel and partly on user equipment specific RRC messages. At least part of the signalling may be done implicitly by linking the signalling to parameters signalled on a scheduling grant. The signalling may also be provided entirely on a broadcast channel. For example, a broadcast channel may be provided with a LTE-A specific part, and LTE-A capable communication devices may read the mode and separation related parameters from such a broadcast channel.

The mode to be used by a communication device may be selected based on signalling that is specific or dedicated to a communication device. For example, the selection may be done based on radio resource control (RRC) signalling and/or on uplink (UL) grant signalling. Alternatively, or additionally, the selection can be based on other information, for example frequency location of uplink physical resource block (PRB) allocation. In accordance with another example, the mode selection can be based on a rank indicator in a scheduling grant message. For example, either the Rel8 DMRS mode or DMRS adjustment mode can be used when the rank indicator communicated for example on RRC signalling is less than or equal to a threshold. If the rank indicator is larger than the threshold, only Rel8 DMRS can be used. To illustrate, if the threshold is 2, and if the rank indicator is 1 or 2, either of DMRS mode can be used by a communication device and if rank indicator is 3 or 4, only Rel8 DMRS mode can be used by the communication device.

The mode selection function can be provided by the control apparatus of a network node. In the FIG. 10 embodiment this would occur at step 100. For example, a base station can decide the mode and signal the decision at 102 to a communication device. The communication device receives the signalling and can then control its operation accordingly at 104.

In the adjustment mode, demodulation reference signal bandwidth may be adjusted to be the same within a set of user equipments with relatively similar bandwidth allocations. The demodulation reference signals can be separated between different user equipments that have significantly different bandwidth allocations based on technologies such as, for example, interleaved frequency division multiple access (IFDMA) and/or block spreading, or based on any other appropriate orthogonalisation method. Demodulation reference signal bandwidth can be equal to or larger than the bandwidth of the symbols carrying data, for example based on single carrier frequency division multiple access (SC-FDMA).

The frequency location and bandwidth of demodulation reference signal can be selected from a predetermined cell-specific demodulation reference signal bandwidth tree. The selection may be provided at 100 in the embodiment shown in FIG. 10. The tree may resemble, for example, the LTE Release 8 sounding reference signal (SRS) bandwidth tree. Thus othogonality between demodulation reference signals of different cells may be provided. Demodulation reference signal bandwidth tree used in a cell can be selected from predetermined set of options and indicated for the user equipment with the radio resource control (RRC) signalling. The indication can be provided for the communication devices for example by means of broadcasting. The demodulation reference signal sequence and bandwidth selection can also be done according to the physical resource block (PRB) allocation in uplink grant which is used for data transmission. According to a possibility the selection is signalled for the user equipment on a higher layer, for example with semi-persistent scheduling.

In FIG. 5 a communication device UE1 is located in cell A, UE2 in cell B and UE3 in cell C. All devices UE1 to UE3 are shown to be in the DMRS mode. Of these devices UE2 is allocated partially on the DMRS adjustment mode region 52 as defined by a demodulation reference signal bandwidth tree. The bandwidth tree can be signaled to the communication device at step 102 of FIG. 10. However, UE2 selects the DMRS mode as the allocated bandwidth is overlapping with bandwidth reserved to the DMRS mode. The selection may be based e.g. a scheduler strategy which in turn may depend on factors such as path loss characteristics. In this example the control apparatus of a base station, for example an eNB, makes the mode selections.

Communication device UE4 that is shown to be located in cell A and in region 52 is configured such that it selects to be in Rel8 DMRS mode even in such a situation. Thus a cell A specific sequence group is used. Cross-correlations are considered to be an acceptable level for example due to block spreading or favorable interference conditions. If different sequence groups are needed, demodulation reference signal (DM RS) hopping between slots can be used.

Communication devices UE5 in cell B and UE6 cell C are shown to be in the DMRS adjustment mode region 52. Although not shown, the demodulation reference signal bandwidth for these communication devices may be scaled accordingly. The same sequence group is used by all communication devices in this mode, and the demodulation references signals are orthogonal. However, data bandwidths differ between the communication devices.

The selection of an appropriate mode can be provided in various manners. It is noted that in the below described examples the mode selection between the modes refers to the selection between at least two modes where the orthogonal demodulation reference signal sequences are arranged differently. However, uplink coordinated multi-point (CoMP) or MU-MIMO reception can be used in both modes. Similar principles can be applied to the downlink, should this be required.

In accordance with a possibility one of the available modes is set to provide a default mode. For example, the Rel8 DMRS mode can be set to be the default mode of operation in the FIG. 5 embodiment. The DMRS adjustment mode can then be used when an orthogonal or nearly orthogonal demodulation reference signal over coordinated multi-point area and/or different bandwidths is determined as necessary. The determination may be provided for example by an eNB, an appropriate scheduler apparatus or another appropriate network entity.

In accordance with another selection criteria Rel8 DMRS mode, or another non-adjusted mode, may be used for example when CoMP or MU-MIMO is not provided in an access system, or a communication device is not part of a coordinated multi-point or MU-MIMO. Also, such a unmodified mode may be used when alignment of bandwidth and frequency position allocations is considered as being feasible in a coordinated multi-point or a MU-MIMO based system, or occurrence of high demodulation reference signal correlations can be taken into account in scheduling, for example by means of cyclic shift allocations. Also, the unmodified mode may be selected to be used if the CoMP area relies on advanced user equipment pairing taking the demodulation reference signal correlations into account in scheduling, for example by means of resource allocation. The decision in this regard may be provided for example by an eNB, an appropriate scheduler apparatus or another appropriate network entity.

In the case of MU-MIMO, sequence group adjustments, as discussed below, may not necessarily always bring much if any additional benefit. Therefore, from the MU-MIMO viewpoint, it can be sufficient that a demodulation reference signal adjustment mode provides separation by means of demodulation reference signal bandwidth adjustments only without any sequence group adjustment. However, it may not be necessarily in all applications to define separate modes for MU-MIMO and coordinated multi-point applications.

The sequence groups may be configured as follows. For example in LTE Release 8, Physical Uplink Shared Channel (PUSCH) sequence group can be derived from cell identity (ID) and a higher layer signalled $\Delta_{ss}$ parameter. The parameter can be seen as a kind of 'sequence group offset'. It is sufficient to define and signal from the network to a communication device a second cell-specific $\Delta_{ss}$ parameter for the DMRS adjustment mode.

The additional signalling may comprise a second cell-specific $\Delta_{ss}$ parameter on user equipment specific RRC messages and/or on a broadcast channel (BCH). The second cell-specific parameter may occupy 5 bits, for example. Indication of user equipment specific demodulation reference signal mode may also be communicated on user equipment specific RRC messages. As this can be an on/off type flag, the indication may be as short as 1 bit long. Indication of used demodulation reference signal bandwidth tree can also be communicated on user equipment specific RRC messages and/or on the BCH. This can take 3 bits, for example.

Demodulation reference signal mode can be selected based on the physical resource block (PRB) allocation frequency location. The control apparatus in the network selects the reference signal mode. The selection can be signalled implicitly in the PRB allocation. The communication device can determine based on pre-determined rules and/or additional signalling how to select correct mode for its operation based on the PRB allocation.

A demodulation reference signal bandwidth tree that is used in DMRS adjustment mode can cover only a part of the system bandwidth, similarly to sounding reference signal (SRS) bandwidth tree. In such a situation, when a communication device in DMRS adjustment mode receives uplink grant allocating any of the PRBs that are outside demodulation reference signal bandwidth tree, the communication device can revert to the Rel8 DMRS mode and select a demodulation reference signal from an appropriate sequence group in accordance with the Rel8 DMRS mode.

Legacy communication devices may always remain in unmodified mode. For example, user equipments that operate in accordance with LTE Releases 8 and 9 may always remain in the Rel8 DMRS mode.

The sequence group used in the DMRS adjustment mode can be different from any of the sequence groups used for the Rel8 DMRS mode in cells A to C within the coordinated multi-point area. Alternatively, the sequence group used in the DMRS adjustment mode can be one of the Rel8 DMRS mode sequence groups used within a coordinated multi-point area. For example, in FIG. 5 the sequence group 2 used in cell B is used for the adjustment mode in all cells A to C within the coordinated multi-point area. If coordinated multi-point is intensively used in the network, former case may potentially require introduction of DMRS adjustment mode specific demodulation reference signal hopping patterns to minimize sequence group collisions. This can be provided for example by expanding the number of existing hopping patterns. In the latter case, a communication device in the DMRS adjustment mode may need to use block spreading over demodulation reference signal symbols to improve demodulation reference signal cross-correlations with Rel8 DMRS mode communication devices, and in particular with communication devices in cell B. This possibility is discussed further below in the context of demodulation reference signal adjustments.

For each system bandwidth, it may be beneficial to have multiple demodulation reference signal bandwidth trees with varying maximum bandwidth, similarly to the SRS bandwidth tree arrangement in accordance with LTE Release 8.

In the DMRS adjustment mode, a user equipment can adjust the bandwidth and frequency position of demodulation reference signal to align demodulation reference signal between different user equipments. This can be used to allow for cyclic shift separation between different user equipments with relatively similar allocated bandwidths. For example, reference signals can be separated such that demodulation reference signal frequency location for different user equipments is aligned by using demodulation reference signal bandwidth tree. Examples of demodulation reference signal bandwidth trees are shown in FIGS. 6a and 6b. The demodulation reference signal bandwidth can be moderately expanded to allow cyclic shift separation between user equipments with relatively similar data bandwidth allocations. The demodulation reference signal can also be separated by using IFDMA and/or block spreading between user equipments with a significant difference in data bandwidth allocations.

The demodulation reference signal bandwidth tree can be either a tree where the wider bandwidth is always multiple of the narrower bandwidth, as is shown in FIG. 6a. Alternatively, demodulation reference signal tree can just provide different bandwidth options, as shown in FIG. 6b. A particular IFDMA comb or block spreading code, or a combination of these, can be mapped to each demodulation reference signal tree layer.

To illustrate this further, the total number of IFDMA combs or block spreading codes, or combinations of them, can be denoted with parameter N. If parameter N is small with respect to the number of layers in the demodulation reference signal bandwidth tree, a conventional tree as shown in FIG. 6a may be considered more attractive. However, if parameter N is comparable to the number of tree layers, a bandwidth option tree as in FIG. 6b may be considered as more useful. A number of tree options may be made available, and base stations can be configured to use one ore more of the available tree options.

Examples for demodulation reference signal bandwidth adjustment are shown in FIGS. 7 and 8 for scenarios where N=2 and N=4, respectively. More particularly, FIG. 7 shows an example of demodulation reference signal bandwidth adjustments in 'DMRS adjustment' mode using IFDMA with repetition factor (RPF)=2, and FIG. 8 shows an example of demodulation reference signal bandwidth adjustments in 'DMRS adjustment' mode using combination of IFDMA with RPF=2 and block spreading. Note that N corresponds to the number of bandwidth options that are available, and is a product of RPF and number of available cover codes. IFDMA represents an example of transmission scheme which creates comb-shaped frequency spectrum. This can be made in such that a demodulation reference signal is mapped into every second IFFT pin at the transmitter. Another sequence from another communication device can be allocated into adjacent frequency "comb". A benefit of this arrangement is that it may allow orthogonal FDM multiplexing between sequences of different bandwidths and/or non-overlapping frequency allocations.

In both FIGS. 7 and 8 a demodulation reference signal bandwidth tree is shown on the left, user equipment specific uplink allocations, or more particularly, the frequency and bandwidth for SC-FDMA data symbols, are shown on the centre, and the used demodulation reference signal in terms of frequency position, bandwidth and used IFDMA comb is shown on the right. FIG. 8 shows also a block cover combination that is used on the right, see under heading 'DM RS BW'.

The embodiments provide control on the demodulation reference signal cross-correlations between user equipments in Rel8 DMRS mode and in DMRS adjustment mode. This may become an issue In particular when the same sequence group is used in both modes. This situation cannot be resolved by demodulation reference signal hopping, unless new hopping patterns are defined for DMRS adjustment mode. This can be resolved by separating the demodulation reference signals with block spreading.

If block spreading is not part of the N, then block spreading with [1-1] can be used as default option in DMRS adjustment mode. If block spreading is part of the N, then block spreading code [1-1] can be mapped to the demodulation reference signal bandwidths that are most frequently used in coordinated multi-point. Such bandwidth can be, for example, the narrowest bandwidth.

In FIG. 7 the circled communication device UE 13 is in Rel8 DMRS mode. The demodulation reference signals are separated with block spreading from communication devices that are in DMRS adjustment mode. In FIG. 7 the separation is based only on IFDMA. IFDMA comb index (0, 1) is indicated on the row of 'IFDMA comb'.

In FIG. 8 the circled communication device UE 13 is also in Rel8 DMRS mode. To obtain orthogonality between communication device UE13 and communication devices that are in the adjustment mode, only 4 PRB and 12 PRB demodulation reference signal allocation is used in cells A and C. In the example of FIG. 8, code [1-1] is mapped to bandwidths provided by options 12 physical resource block (PRB) and 4 physical resource block. Thus the data bandwidth allocations for the three cells A, B and C on the right when N=4 are based on the rightmost two layers of the bandwidth tree on the left.

It is noted that it may be beneficial to change the IFDMA comb between slots. The change may be provided e.g. by means modular shift. In other words, a communication device using comb 0 in slot 0 would use comb 1 in slot 1. This can be used to allow for more accurate channel estimate on the edge of the demodulation reference signal bandwidth.

The data processing functions for providing appropriate control for the demodulation and related communication aspects in an access system and a communication device may be provided by means of one or more data processors. The described functions may be provided by separate processors or by an integrated processor. The data processing may be distributed across several data processing modules. A data processor may be provided by means of, for example, at least one chip. Appropriate memory capacity can also be provided in the relevant control apparatus. An appropriately adapted computer program code product or products may be used for implementing the embodiments, when loaded on an appropriate data processing apparatus, for example for determining appropriate modes to be used, including appropriate indications of the modes in messages and so on, in a processor apparatus 13 associated with the base station 12 shown in FIG. 1 and/or in a data processing apparatus 3, 4 and 9 of the mobile communication device 1 of FIG. 2. The program code product for providing the operation may be stored on, provided and embodied by means of an appropriate carrier medium. An appropriate computer program can be embodied on a computer readable record medium. A possibility is to download the program code product via a data network.

The above described embodiments may allow creation of demodulation reference signal sequences with good cross-correlation for example in multipoint and multi-user communications. The embodiments may be used to reduce and/or control sounding reference signal (SRS) cross correlation. The embodiments may enable multi-cell uplink PUSCH reception. The embodiments may provide orthogonal demodulation reference signal sequences for uplink coordinated multi-point/MU-MIMO while the scheduling restrictions over the cells needed for user equipments using orthogonal demodulation reference signal sequences may be relaxed. Demodulation reference signal induced scheduling restrictions may be avoided for user equipments that are not in coordinated multi-point reception. High demodulation reference signal cross-correlations due to the use of same sequence group in multiple cells may also be avoided. A back compatible design of later releases with systems and equipment such as those that are for example LTE Release 8 compatible in their DMRS/SRS design may be provided. Need for additional reference signal sequences may be avoided. Existing demodulation reference signal randomization procedures such as sequence hopping, sequence group hopping (on/off) and cyclic shift hopping may be reused. Use of a bandwidth tree with several bandwidth options may allow for controlling the amount of excess demodulation reference signal spread. It is noted that the invention can be embodied regardless if uplink coordinated multi-point is provided or not.

It is also noted that whilst embodiments have been described in relation to communications system such as those based on the LTE and 3GPP based systems, similar principles can be applied to any other communication system where demodulation reference signals are used. Also, instead of communications between base station and communication devices the communications may be provided directly between two or more communication devices. For example, this may be the case in application where no fixed station equipment is provided but a communication system is provided by means of a plurality of user equipment, for example in adhoc networks. Also, the above described principle can also be used in networks where relay nodes are employed for relaying transmissions between other stations. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the spirit and scope of the present invention.

The invention claimed is:

1. A method, comprising
transmitting, by communication devices, demodulation reference signals within associated cells using at least two different modes, wherein
in a first mode demodulation reference signals that are grouped into a same sequence group are communicated and separation of the demodulation reference signals across the cells and the communication devices is provided by adjusting bandwidth options on the transmitted demodulation reference signals; and
in a second mode demodulation reference signals that are grouped into different sequence groups are communicated and non-adjusted across the cells and the communication devices.

2. The method as claimed in claim 1, wherein the separation in the first mode comprises orthogonalisation of the demodulation reference signals.

3. The method as claimed in claim 1, wherein the separation in the first mode comprises cyclic shifting of the demodulation reference signals.

4. The method as claimed in claim 1, comprising coordinating use of the different modes by a bandwidth tree.

5. The method as claimed in claim 4, wherein the bandwidth tree resembles a sounding reference signal bandwidth tree.

6. The method as claimed in claim 4, wherein the bandwidth tree is arranged to have wider bandwidths that are multiples of a narrower bandwidth or the bandwidth tree is arranged to provide different bandwidth options.

7. The method as claimed in claim 4, comprising providing an indication for a communication device of a bandwidth tree to be used.

8. The method as claimed in claim 1, wherein the separation in the first mode comprises at least one of adjusting bandwidth or applying an interleaved frequency division multiple access (IFDMA) comb to the demodulation reference signals.

9. The method as claimed in claim 1, wherein the first mode comprises adjusting cyclic shifting of the demodulation reference signal.

10. The method as claimed in claim 5, comprising adjusting the bandwidth to be the same within a set of communication devices with substantially similar bandwidth allocations.

11. The method as claimed in claim 1, comprising use of block spreading to separate demodulation reference signals.

12. The method as claimed in claim 1, comprising providing acceptable cross-correlation properties in a system comprising a plurality of base stations by ensuring that acceptable orthogonality is maintained between the base stations when needed.

13. The method as claimed in claim 1, comprising selecting the first mode when substantially orthogonal demodulation reference signal sequences are considered necessary and selecting the second mode where demodulation when demodulation reference signal orthogonality is not considered necessary.

14. The method as claimed in claim 1, wherein the separation in the first mode comprises adjusting demodulation reference signals to provide substantially orthogonal demodulation references signals in a plurality of cells.

15. The method as claimed in claim 1, comprising selecting at a communication device one of the available modes.

16. The method as claimed in claim 15, comprising selecting the mode based on dedicated signaling.

17. The method as claimed in claim 15, comprising selecting the mode based on radio resource control signaling, uplink grant signaling, or both.

18. The method as claimed in claim 15, comprising selecting the mode based on a scheduling rank and a threshold.

19. The method as claimed in claim 15, comprising selecting the mode based on information regarding frequency location of a physical resource block allocation.

20. The method as claimed in claim 1, comprising switching from a mode to another mode in response to detection of a predefined event.

21. The method as claimed in claim 20, comprising using the second mode as a default mode and switching to the first mode in response to determination of a need for improved orthogonality.

22. The method as claimed in claim 1, wherein the sequence group of the first mode is one of the different sequence groups available for the second mode.

23. The method as claimed in claim 1, wherein the sequence group of the first mode is not a sequence group of the second mode.

24. The method as claimed in claim 1, comprising assigning the first mode and second mode to different frequency regions.

25. The method as claimed in claim 1, comprising using by at least one communication device, the at least two modes for uplink coordinated multi-point communications.

26. The method as claimed in claim 1, wherein multiple communication points are provided by elements of an multiple input multiple output apparatus, the method comprising use of the at least two modes for uplink communication with the multiple input multiple output apparatus.

27. An apparatus comprising:
at least one processor; and
at least one memory including computer program code,
the at least one memory and the computer program code being configured, with the at least one processor, to cause the apparatus to perform at least the following:
controlling use of at least two different modes for transmitting, by communication devices, demodulation reference signals within associated cells, wherein
in a first mode demodulation reference signals that are grouped into a same sequence group are communicated and separation of the demodulation reference signals across the cells and the communication devices is provided by adjusting bandwidth options on the transmitted demodulation reference signals, and
in a second mode demodulation reference signals that are grouped into different sequence groups are communicated and non-adjusted across the cells and the communication devices.

28. The apparatus as claimed in claim 27, wherein the separation of the demodulation reference signals in the first mode is provided by orthogonalisation of the demodulation reference signals.

29. The apparatus as claimed in claim 27, wherein the separation of the demodulation reference signals in the first mode is provided by cyclic shifting of the demodulation reference signals.

30. The apparatus as claimed in claim 27, wherein the at least one memory and the computer program code being configured, with the at least one processor, to cause the apparatus to perform: coordinating use of the different modes by means of a bandwidth tree.

31. The apparatus as claimed in claim 30, wherein the bandwidth tree resembles a sounding reference signal bandwidth tree.

32. The apparatus as claimed in claim 30, wherein the bandwidth tree is arranged to have wider bandwidths that are multiples of a narrower bandwidth or the bandwidth tree is arranged to provide different bandwidth options.

33. The apparatus as claimed in claim 30, wherein the at least one memory and the computer program code being configured, with the at least one processor, to cause the apparatus to perform: providing an indication for a communication device of a bandwidth tree to be used.

34. The apparatus as claimed in claim 27, wherein the at least one memory and the computer program code being configured, with the at least one processor, to cause the apparatus to perform: providing the separation in the first mode by at least one of adjusting bandwidth or applying an interleaved frequency division multiple access (IFDMA) comb to the demodulation reference signals.

35. The apparatus as claimed in claim 27, wherein the at least one memory and the computer program code being configured, with the at least one processor, to cause the apparatus to perform: adjusting cyclic shifting of the demodulation reference signal in the first mode.

36. The apparatus as claimed in claim 35, wherein the at least one memory and the computer program code being configured, with the at least one processor, to cause the apparatus to perform: adjusting the bandwidth to be the same within a set of communication devices with substantially similar bandwidth allocations.

37. The apparatus as claimed in claim 27, wherein the at least one memory and the computer program code being configured, with the at least one processor, to cause the apparatus to perform: using block spreading to separate demodulation reference signals.

38. The apparatus as claimed in claim 27, wherein the at least one memory and the computer program code being configured, with the at least one processor, to cause the apparatus to perform: providing acceptable cross-correlation properties in a system comprising a plurality of base stations by ensuring that acceptable orthogonality is maintained between the base stations when needed.

39. The apparatus as claimed in claim 27, wherein the at least one memory and the computer program code being configured, with the at least one processor, to cause the apparatus to perform: selecting the first mode when substantially orthogonal demodulation reference signal sequences are considered necessary and to select the second mode where demodulation when demodulation reference signal orthogonality is not considered necessary.

40. The apparatus as claimed in claim 27, wherein the at least one memory and the computer program code being configured, with the at least one processor, to cause the apparatus to perform: providing the separation in the first mode by means of adjusting demodulation reference signals to provide substantially orthogonal demodulation references signals in a plurality of cells.

41. The apparatus as claimed in claim 27, wherein the at least one memory and the computer program code being configured, with the at least one processor, to cause the apparatus to perform: providing switching from a mode to another mode in response to detection of a predefined event.

42. The apparatus as claimed in claim 41, wherein the at least one memory and the computer program code being configured, with the at least one processor, to cause the apparatus to perform: using the second mode as a default mode and to switch to the first mode in response to determination of a need for improved orthogonality.

43. The apparatus as claimed in claim 27, wherein the at least one memory and the computer program code being configured, with the at least one processor, to cause the apparatus to perform: assigning the first mode and second mode to different frequency regions.

44. The apparatus as claimed in claim 27, wherein the multiple communication points of the system comprise stations of a cellular system, and wherein the at least one memory and the computer program code being configured, with the at least one processor, to cause the apparatus to perform: using the at least two modes for uplink coordinated multi-point communications.

45. The apparatus as claimed in claim 27, wherein the multiple communication points are provided by elements of a multiple input multiple output apparatus, and wherein the at least one memory and the computer program code being configured, with the at least one processor, to cause the apparatus to perform: using the at least two modes for uplink communication with the multiple input multiple output apparatus.

46. The apparatus as claimed in claim 27, wherein the at least one memory and the computer program code being configured, with the at least one processor, to cause the apparatus to perform: selecting the mode based on radio resource control signaling, uplink grant signaling, or both.

47. The apparatus as claimed in claim 27, wherein the at least one memory and the computer program code being configured, with the at least one processor, to cause the apparatus to perform: selecting the mode based on a scheduling rank and a threshold.

48. The apparatus method as claimed in claim 27, wherein the at least one memory and the computer program code being configured, with the at least one processor, to cause the apparatus to perform: selecting the mode based on information regarding frequency location of a physical resource block allocation.

49. An apparatus in accordance with claim 27 comprising a communication device.

50. An apparatus as claimed in claim 49, wherein the apparatus is configured to select one of the available modes based on signals from a base station.

51. An apparatus in accordance with claim 27 comprising a base station.

52. An apparatus as claimed in claim 51, configured to communicate information regarding mode selection to a communication based on dedicated signaling, broadcasting, or both signaling and broadcasting.

53. A computer program product directly loadable into the internal memory of a digital computer comprising software code configured to perform:
  transmitting, by communication devices, demodulation reference signals within associated cells using at least two different modes, wherein
    in a first mode demodulation reference signals that are grouped into a same sequence group are communicated and separation of the demodulation reference signals across the cells and the communication devices is provided by adjusting bandwidth options on the transmitted demodulation reference signals; and in a second mode demodulation reference signals that are grouped into different sequence groups are communicated and non-adjusted across the cells and the communication devices.

* * * * *